July 22, 1958     L. AZARRAGA     2,844,069
CURVED FILM CAMERA
Filed April 24, 1957     3 Sheets-Sheet 1
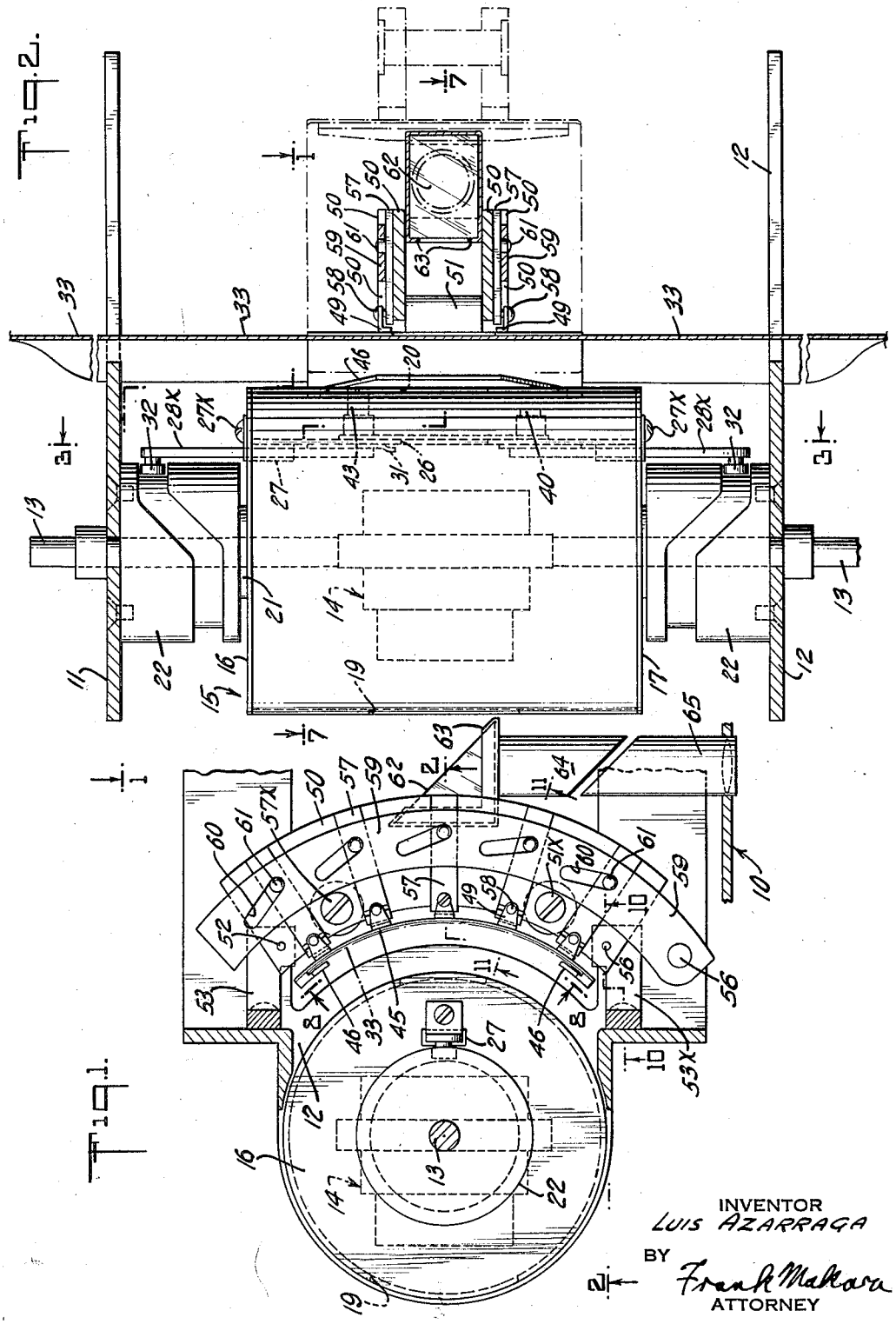
INVENTOR
LUIS AZARRAGA
BY Frank Makara
ATTORNEY July 22, 1958   L. AZARRAGA   2,844,069
CURVED FILM CAMERA
Filed April 24, 1957   3 Sheets-Sheet 2
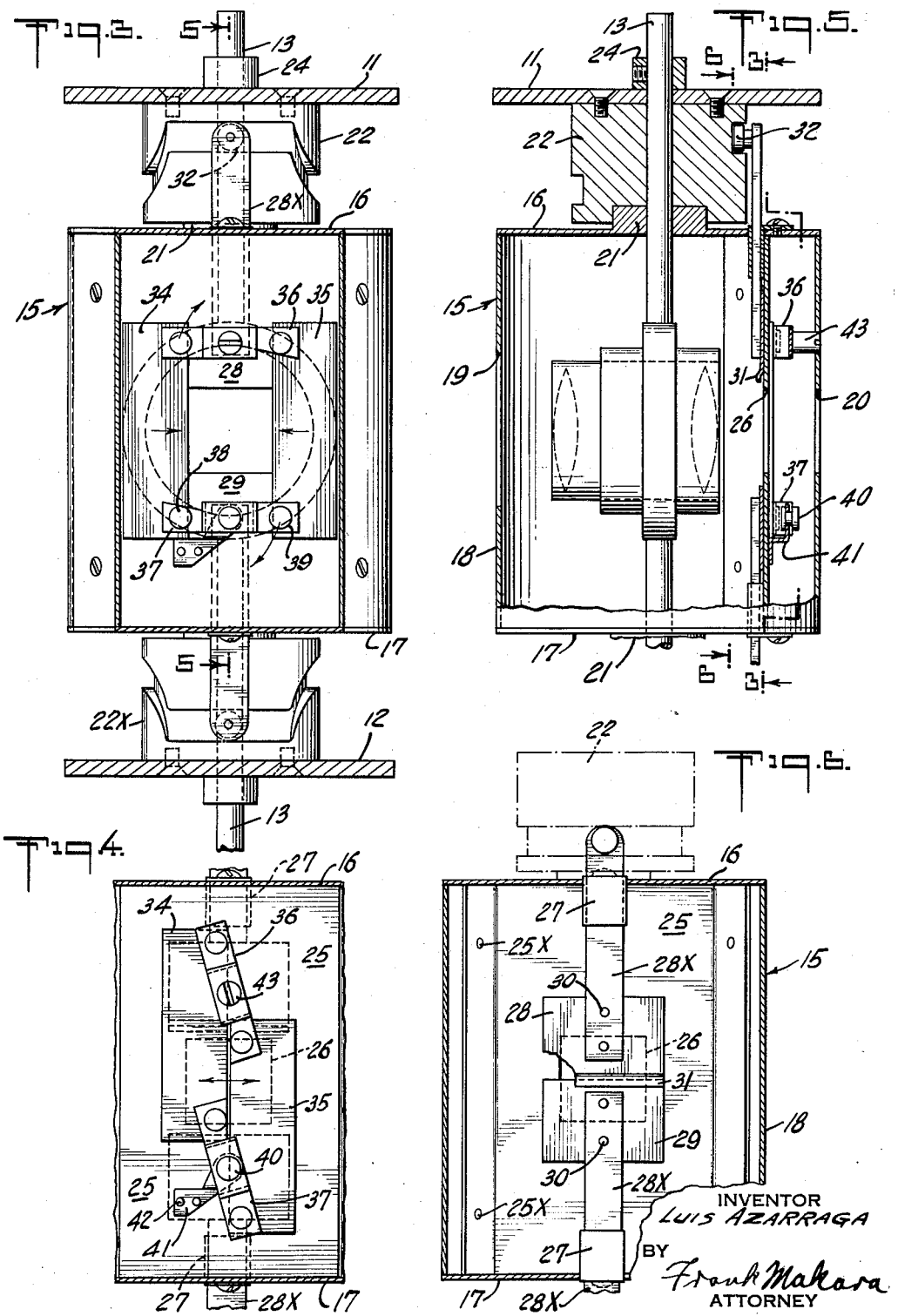

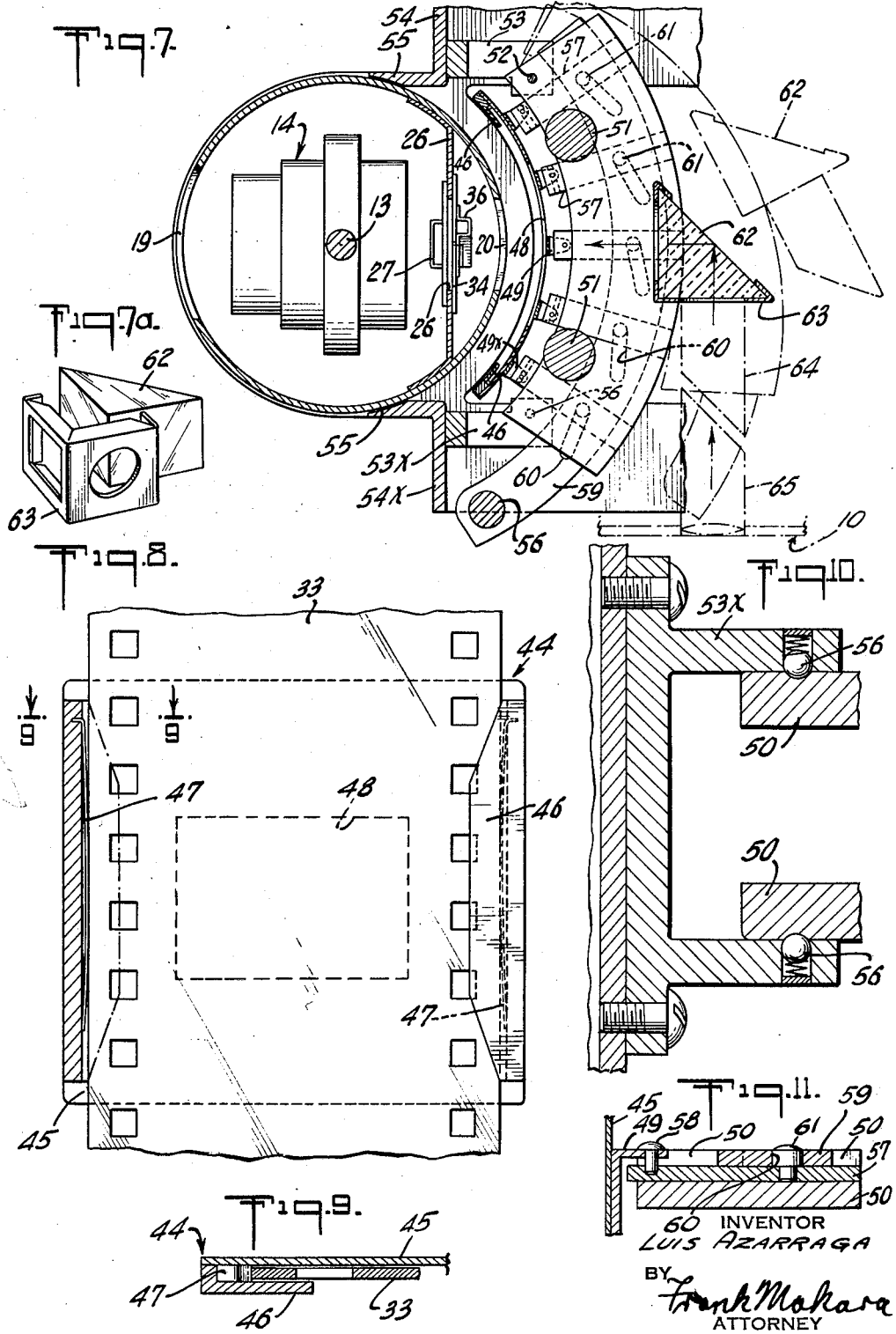

2,844,069

CURVED FILM CAMERA

Luis Azarraga, Mineola, N. Y.

Application April 24, 1957, Serial No. 654,724

5 Claims. (Cl. 88—16)

This invention relates to a camera using a curved film.

This invention is a continuation-in-part of applicant's invention Serial Number 608,971, filed September 10, 1956, now abandoned.

An object of this invention is to provide an auxiliary lens to view the focus of the camera lens.

Another object is to provide a light control diaphragm in the camera.

These and other objects will become apparent upon reading the following disclosure taken in conjunction with the drawing in which:

Fig. 1 is a section view taken on line 1—1 of Fig. 2,

Fig. 2 is a vertical section view taken on line 2—2 of Fig. 1,

Fig. 3 is a vertical section view taken on line 3—3 of Fig. 2,

Fig. 4 is a vertical section rear view of the closed shutter gates,

Fig. 5 is a vertical section view taken on line 5—5 of Fig. 3,

Fig. 6 is a rear view of the gates and taken on line 6—6 of Fig. 5,

Fig. 7 is a transverse view taken on line 7—7 of Fig. 2,

Fig. 7a is a view showing the manner of holding the prism lens in a frame,

Fig. 8 is a section view taken on line 8—8 of Fig. 1,

Fig. 9 is a section view taken on line 9—9 of Fig. 8,

Fig. 10 is a section view taken on line 10—10 of Fig. 1 and

Fig. 11 is a section view taken on line 11—11 of Fig. 1.

Turning to the drawing, a box-like camera housing 10 (Figs. 1 and 5) is provided with a top horizontal wall 11 and a bottom horizontal wall 12. A split shaft 13 having a top section and a bottom section is disposed through camera walls 11 and 12 and motivated by an electrical motor or spring wound means (not shown).

A conventional lens assembly 14 is mounted between the top and the bottom section split shaft 13 and fixedly secured to the shaft sections and rotates with the shaft.

A cylindrical enclosing container 15 is provided having a top wall 16, a bottom wall 17 and a cylindrical wall 18 having a front aperture 19 and a diametrically opposed rear aperture 20. The shaft 13 is mounted centrally within container 15 with the lens axis disposed in line with said apertures 19 and 20.

The end walls 16 and 17 are each provided with apertured raised central sections 21 (Fig. 5) and the respective shaft 13 sections are press fitted or secured by set screws (not shown) into the respective apertures so that the cylinder 15 turns as a unit with the shaft 13 and its lens 14.

A pair of identical grooved apertured guide blocks 22 and 22X are fixedly secured respectively to the top camera wall 11 and the bottom camera wall 12 by screws 23. The top section of shaft 13 is disposed through the aperture of block 22 and the bottom section of shaft 13 is disposed through the aperture of block 22X. A holding collar 24 is secured by a set screw to the top section of shaft 13 and permits lens 14 to be centered relative to apertures 19 and 20.

The cylinder 15 is provided with a fixed spot welded vertical flat interiorly disposed wall 25 having spot welds 25X and having an aperture 26 in line with apertures 19 and 20 of the cylinder wall 18.

The square aperture of vertical wall 25 is provided with a pair of swingable selectively fixed gates for adjusting the horizontal width of the aperture and this aperture is provided also with a pair of vertically reciprocating shutter gates for opening and closing the adjusted aperture with each rotation of the cylinder and its lens (Figs. 3 to 6).

As shown in Fig. 6, a pair of suitable tubular guides 27 are secured as by screws 27X to both the top and the bottom wall of cylinder 15 and centrally in line with aperture 26. A flat travel pin 28X is disposed in each of the top and the bottom tubular guides 27 and secured to a respective top shutter gate 28 and a bottom shutter gate 29 as by spot welds 30. The shutter gate area extends suitably beyond the edges of the aperture 26 and preferably the top gate 28 is provided with an over-lap rim 31 so that when the shutters are in light tight closed relationship the rim 31 over-laps the top edge of bottom gate 29 to exclude all light from passing between the gates.

The travel pins 28X are each provided at their ends removed from their gate attachment ends with a travel stud 32. The studs 32 are disposed in the grooves of the respective guide blocks 22 and 22X each having a continuous circumferential groove so that rotation of the cylinder 15 along with the studs 32 causes the shutter gates 28 and 29 to assume the closed position when the gates are moved to the front of the camera and then to assume the open position when on 180 degrees of further travel the gates become disposed toward the rear film holding end of the camera.

In other words, the gates 28 and 29 rise and fall due to the travel of studs 32 in the grooves of blocks 22 and 22X being closed when facing the front of the camera and open (Fig. 5) when disposed toward the rear or adjacent the film 33. The front of the camera is where the continuous grooves of blocks 22 come closest together and therefore to the left of Fig. 2 and so away from the photographic film 33.

Turning to Figs. 3 and 4, there is shown a means of fixing the width of the operating aperture of the camera. To fix this closure over aperture 26 a pair of swing gates 34 and 35 are provided. The gates 34 and 35 are connected by a top rotatable bar 36 and by a bottom rotatable bar 37.

The movement of gates 34 and 35 is simultaneous and selectively outward or inward toward one another as well as downward or upward since the gates are respectively secured by bars 36 and 37.

Bar 37 is provided with pivot pins 38 and 39 securing the bar 37 pivotally to gates 34 and 35 respectively. The bar 37 is also provided with a central pivot pin 40 disposed in an angular offset support 41 said support being secured by spot wells 42 to wall 25. The pin 40 is disposed in that portion of the angular support 41 located in spaced relationship to wall 25. An adjustment pin 43 having a screw driver receiving slot is fixedly welded to bar 36 in the middle elevated bridge portion and extends into a cylinder 15 aperture provided for pin 43 (Fig. 5) so that rotation of pin 43 as by a screw driver selectively increases or decreases the distance between gate 34 and 35 equally toward fixed pivot pin 40. Clearly pins 40 and 43 are both in line with the center of aperture 26 and bar 37 is motivated by rotation of the interconnected bar 36 by rotating the fixed slotted pin 43 secured rigidly thereto.

Another important feature of this invention is the radial focusing of the film. This is done by passing the film 33 continuously through a film holder 44 (Figs. 8 and 9) which may be moved radially toward or away from lens 14.

The film holder 44 comprises a curved centrally apertured sheet metal plate 45 (shown flat in Fig. 9 for purposes of clarity) secured as by a welding to a pair of right angle spaced-apart holder arms 46. As shown in Figs. 8 and 9 a clip spring 47 is secured in a suitable notch in each respective arm 46 and the opposed edges of the film engage these opposed spring clips so that the film continuously maintains a bowed or curved contact with the curved plate 45. The film 33 is captively held against plate 45 also by the overlying walls of the respective opposed holder arms 46.

The aperture in plate 45 is perferably a square aperture 48 (Fig. 8).

The film holder 44 is provided at its rear face with a plurality of top and bottom right angle brackets 49, disposed one above the other adjacent aperture 48, but united to form a unitary U-shaped bracket 49X when secured to plate 45 in lateral spaced relationship to aperture 48.

A pair of curved support bars 50 are disposed one above the other and behind the film holder 44 in spaced relationship thereto. A pair of cylindrical pillars 51 are secured at a suitable interval to both the top and the bottom support bars 50 as by screws 51X. Thus the support bars and their uniting pillars 51 are a rigid structure. The spaced-apart support bars 50 are hinged by a hinge pin 52 to and between the legs of a U-channel bar 53, said bar 53 being secured as by welding or screws to a camera box support 54. As shown in Fig. 7 a second U-channel bar 53X is disposed in linear opposed relationship to bar 53 along the opposite edge of film 33 and this bar 53X is secured to a corresponding camera box support 54X. The box supports 54 and 54X are provided with curved tapering edges 55 so that they closely approach the rotating cylinder wall 15 thereby excluding the passage of light therebetween, said edges 55 being provided with black felt, if desired, to effect contact with container 15.

The end of the support bars 50 opposed to the hinge 52 is provided with a finger grip 56 to permit swinging of the support bars 50 and the attached film holder 44 away from the cylinder 15 (the swung position is shown in Fig. 2 in dotted outline), thereby permitting easy insertion of the film 33 in its holder 44.

The two support bars 50 are secured in closed position to channel bar 53X by at least one conventional ball detent 56 located in bar 53X. Alternatively the ball detent may be located in a support bar 50 and its co-acting locking cavity be disposed in the channel bar 53X.

As shown in Figs. 2 and 11 the two support bars 50 are provided with transverse deep grooves equal in number to brackets 49 and 49X. In Fig. 1 top support bar 50 (and the bottom support bar 50) are each provided with five transverse deeply cut grooves. These grooves are each provided with a slide bar 57 which is secured at one end to the adjacent bracket 49 by a pivot pin 58.

The two bars 50 are each further provided with a curved longitudinal groove running the length of each bar and a push rod or bar 59 is disposed in each longitudinal groove.

It will be seen that each push bar 59 contacts its respective slide bars 57 at a point removed from its corresponding pivot pin 58 (Fig. 11).

Each push bar 59 is provided with suitable angularly disposed slots 60 equal in number to the number of slide rods contacted by the push rod. A slide pin 61 is disposed in each slot 60 and press fitted into its corresponding slide bar 57.

It will therefore be seen that as the push rods 59 are pushed (or pulled) in their longitudinal grooves as a unit, the slide bars 57 are pushed toward or away from the lens 14. And since the film holder 44 is secured to the brackets 49 and 49X which latter are secured pivotally through pins 58 to slide bars 57, it is evident that the film 33 and the film holder 44 also moves toward or away from lens 14 on movement of the push rods 59.

The sighting of the focus to see if it is correct is done by locating a prism lens 62 behind aperture 58. The prism 62 is provided with a right angle frame piece 63 having an aperture in each angular leg. The frame piece 63 is suitably positioned and press fitted between the top and bottom support bars 50 (Fig. 2).

A sight tube 64 (Fig. 1) is secured by conventional means to the frame 63 on the remaining leg facing a camera side wall. As shown in Fig. 1 the sight tube 64 is provided with an angular end where it joins with a fixed sight tube 65 secured fixedly to the camera side wall 10.

As shown in Fig. 7 the prism 62 swings with the film holder 44 on pivot pin 52.

Clearly sight tube 64 also swings away from the fixed sight tube 65.

After the film has been inserted in film holder 44, the support arms are closed and locked in detents 59. Next the film is focused by sighting the picture to be taken, right through the film 33 and aperture 48 and prism lens 62 and sight tube 65. If adjustment of focus is necessary, the film 33 is moved toward or away from lens 14 as need be by pushing or pulling the push rods 59.

This invention is of broad scope and obvious modifications of its inventive features are intended to be covered by the claims herein.

The camera of this invention also possesses the convenitonal claw feet assembly (not shown) attached to the motor for advancing the film 33 one picture frame for each revolution of the cylinder 15.

I claim:

1. A moving picture panorama camera having a front end and a back end comprising a rotatable cylindrical housing having a top and bottom end wall and a cylinder wall having a front aperture and a rear aperture diametrically opposed to said front aperture, a lens assembly having its lens axis in linear relationship to the center of said front and said rear cylinder apertures, shaft means secured to said cylinder and said lens assmbly for rotating them as a unit, a pair of identical apertured fixed cylindrical guide blocks having suitable continuous grooves therein one disposed above the cylinder wall and the other below the cylinder wall, said shaft means freely passing through said pair of guide blocks, an apertured flat plate secured vertically within said cylinder with the center of the aperture in axial relationship to the lens axis, a top and a bottom shutter gate disposed over the rear surface of said flat plate aperture, bar means secured respectively fixedly to said top and said bottom shutter gate and engaging respectively said grooves of the respective top and bottom guide blocks for effecting suitable reciprocal closing of said shutter when the shutter gates are furthest removed from a photographic film, gate means secured to the front of said flat plate for fixedly adjusting the size of the light effective aperture of said plate, a curved apertured film holder disposed in the back of said camera and containing a continuous strip of curved photographic film, means for moving said film holder toward and away from said cylinder and the lens therein for focusing radially the film relative to said lens, and means for advancing said film one frame for each revolution of said cylinder.

2. The camera of claim 1 wherein the gate means comprise a pair of vertical flat gate plates disposed in front of the flat plate aperture, a pair of rotatable bars one secured to the top of said pair of gates and the other to the bottom of said gates, a bracket for securing the bottom rotatable bar to the flat plate, said top rotatable bar having fixed slot means in its center to permit rotation of said bar thereby increasing and decreasing selectively the distance between the gate plates and therefore the effective light transmitting aperture of said flat plate.

3. The camera of claim 2 wherein the means for radial focusing comprises a pair of identical fixedly spaced-apart curved longitudinal bars having a plurality of angular slots and swingably mounted at one end to the camera casing, each of said bars having bars having a plurality of transverse grooves, a slide bar disposed in each transverse groove, bracket means fixedly secured to the rear wall of the film holder about the film holder aperture and pivotally secured to a respective slide bar, said curved longitudinal bars having a curved longitudinal groove above and partly engaging the respective transverse grooves, a push bar disposed in the longitudinal groove of each longitudinal bar and secured together at one end, and pivot pins disposed in each respective angular slot and secured to the respective slide bar disposed beneath said slot whereby movement of said push bars moves said pivot pins in said slots of said longitudinal bars and therefore said slide bar and the brackets secured pivotally thereto as well as the film holder secured to said brackets.

4. The camera of claim 3 having a U-shaped bracket secured to said camera casing, a detent ball secured in each leg of said U-shaped bracket, said longitudinal bars each having a cavity to lockingly engage respectively said detent balls whereby said film holder may be swung open to insert a strip of continuous film and then lockingly closed by said detent balls.

5. The camera of claim 4 having a sighting prism fixedly disposed between said curved longitudinal bars and linearly behind said aperture in said film holder and a split sight tube of two separate sections one of said sections being secured to said prism and the other to the camera casing to effect linear alignment of the tube sections when the longitudinal bars are in locked position.

References Cited in the file of this patent
UNITED STATES PATENTS

| | | |
|---|---|---|
| 779,956 | Mills | Jan. 10, 1905 |
| 1,693,722 | McInnis | Dec. 4, 1928 |
| 1,837,467 | McInnis | Dec. 22, 1931 |
| 1,943,378 | Elms | Jan. 16, 1934 |

FOREIGN PATENTS

| | | |
|---|---|---|
| 21,154 | Great Britain | of 1890 |
| 672,795 | Great Britain | May 28, 1952 |